United States Patent
Chamyvelumani et al.

(10) Patent No.: US 9,364,775 B2
(45) Date of Patent: Jun. 14, 2016

(54) METHOD OF FORMING FILTER ELEMENTS

(75) Inventors: Satishkumar Chamyvelumani, Wallingford, CT (US); Thomas L. Wood, Hudson, WI (US); Keith D. Solomon, Cheshire, CT (US); Edward M. Czausz, Meriden, CT (US); Aleksander Medved, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 408 days.

(21) Appl. No.: 13/880,934

(22) PCT Filed: Nov. 2, 2011

(86) PCT No.: PCT/US2011/058920
§ 371 (c)(1),
(2), (4) Date: Jul. 31, 2013

(87) PCT Pub. No.: WO2012/061474
PCT Pub. Date: May 10, 2012

(65) Prior Publication Data
US 2013/0299418 A1    Nov. 14, 2013

Related U.S. Application Data

(60) Provisional application No. 61/410,234, filed on Nov. 4, 2010.

(51) Int. Cl.
*B01D 29/00* (2006.01)
*B29C 35/02* (2006.01)
(Continued)

(52) U.S. Cl.
CPC ........ *B01D 29/0093* (2013.01); *B29C 35/0272* (2013.01); *B29C 47/0023* (2013.01);
(Continued)

(58) Field of Classification Search
CPC ............. B01D 29/0093; B29C 47/862; B29C 47/0085; B29C 47/0023; B29C 47/385; B29C 47/0076; B29C 47/92; B29C 35/0272; B29C 2947/9219; B29C 47/903; B29C 2947/92685; B29C 2947/92514; B29C 47/20; B29C 2035/0816; B29C 47/003; B29K 2995/0068; B29K 47/003; B29K 2023/0675; B29L 2031/14
See application file for complete search history.

(56) References Cited

U.S. PATENT DOCUMENTS 3,474,600 A    10/1969  Tobias
3,493,994 A     2/1970  Wersosky
(Continued)

FOREIGN PATENT DOCUMENTS

CN    201109179        9/2008
CN    101518944 A      3/2009
(Continued)

OTHER PUBLICATIONS

Mocho, et al., "Heating Activated Carbon by Electromagnetic Induction", *Carbon*, vol. 34, No. 7, pp. 851-856 (1996).
(Continued)

*Primary Examiner* — Galen Hauth
(74) *Attorney, Agent, or Firm* — Scott A. Baum; Alekasander Medved

(57) ABSTRACT

A method of forming a filter element is disclosed comprising introducing a mixture into a feeder, the mixture comprising a plurality of susceptor particles and a plurality of polymeric binder particles. The mixture is advanced through the feeder and into a die comprising an excitation portion where eddy currents are induced in the susceptor particles by subjecting the mixture to a high-frequency electromagnetic field, the eddy currents being sufficient to elevate the temperature of the susceptor particles to cause adjacent polymeric binder particles to be heated to at least a softening point. The susceptor particles bind with the heated polymeric binder particles in the die to form a coherent mass. The coherent mass is advanced out of the die and cooled to form the filter element.

27 Claims, 8 Drawing Sheets

(51) Int. Cl.
*B29C 47/00* (2006.01)
*B29C 47/86* (2006.01)
*B29C 47/92* (2006.01)
*B29C 47/38* (2006.01)
B29C 35/08 (2006.01)
B29K 23/00 (2006.01)
B29L 31/14 (2006.01)
B29C 47/20 (2006.01)
B29C 47/90 (2006.01)

(52) U.S. Cl.
CPC ......... *B29C47/0076* (2013.01); *B29C 47/0085* (2013.01); *B29C 47/385* (2013.01); *B29C 47/862* (2013.01); *B29C 47/92* (2013.01); *B29C 47/003* (2013.01); *B29C 47/20* (2013.01); *B29C 47/903* (2013.01); *B29C 2035/0816* (2013.01); *B29C 2947/9219* (2013.01); *B29C 2947/92514* (2013.01); *B29C 2947/92685* (2013.01); *B29K 2023/0675* (2013.01); *B29K 2995/0068* (2013.01); *B29L 2031/14* (2013.01)

(56) References Cited

U.S. PATENT DOCUMENTS

| | | | |
|---|---|---|---|
| 3,521,325 A | 7/1970 | Schippers | |
| 3,535,481 A | 10/1970 | Korb | |
| 3,538,020 A | 11/1970 | Heskett | |
| 3,774,890 A * | 11/1973 | Lemelson | B21C 23/085 366/76.92 |
| 3,782,154 A | 1/1974 | Fuchs, Jr. | |
| 3,954,927 A | 5/1976 | Duling | |
| 4,000,236 A | 12/1976 | Redfarn | |
| 4,025,262 A | 5/1977 | Furman | |
| 4,313,325 A | 2/1982 | Staat | |
| 4,420,294 A | 12/1983 | Lichtinghagen | |
| 4,545,950 A | 10/1985 | Motooka | |
| 4,588,633 A | 5/1986 | Kono | |
| 4,664,683 A | 5/1987 | Degen | |
| 4,720,615 A | 1/1988 | Dunn | |
| 4,731,206 A | 3/1988 | Schubert | |
| 4,753,728 A | 6/1988 | VanderBilt | |
| 4,778,601 A | 10/1988 | Lopatin | |
| 5,019,311 A | 5/1991 | Koslow | |
| 5,071,685 A | 12/1991 | Kasprzyk | |
| 5,147,722 A | 9/1992 | Koslow | |
| 5,189,092 A | 2/1993 | Koslow | |
| 5,248,864 A | 9/1993 | Kodokian | |
| 5,249,948 A | 10/1993 | Koslow | |
| 5,249,978 A | 10/1993 | Gazda | |
| 5,331,037 A | 7/1994 | Koslow | |
| 5,340,428 A | 8/1994 | Kodokian | |
| 5,412,185 A | 5/1995 | Sturman, Jr. | |
| 5,679,248 A | 10/1997 | Blaney | |
| 5,817,263 A | 10/1998 | Taylor | |
| 5,840,348 A | 11/1998 | Heiligman | |
| 5,922,803 A | 7/1999 | Koslow | |
| 5,939,012 A | 8/1999 | Stanley | |
| 5,976,432 A * | 11/1999 | Yang | B01D 39/2055 264/105 |
| 5,989,466 A | 11/1999 | Kato | |
| 6,257,863 B1 * | 7/2001 | Otte | B29C 47/124 425/191 |
| 6,368,504 B1 | 4/2002 | Kuennen | |
| 6,637,250 B2 | 10/2003 | Plata | |
| 6,699,561 B2 | 3/2004 | Wolff | |
| 6,770,736 B1 | 8/2004 | Haftka | |
| 7,112,272 B2 | 9/2006 | Hughes | |
| 7,112,280 B2 | 9/2006 | Hughes | |
| 7,169,304 B2 | 1/2007 | Hughes | |
| 7,169,466 B2 | 1/2007 | Taylor | |
| 7,264,726 B1 | 9/2007 | Levy | |
| 7,316,323 B2 | 1/2008 | Collias | |
| 7,317,177 B2 | 1/2008 | Loveless | |
| 7,540,316 B2 | 6/2009 | Collette | |
| 7,718,935 B2 | 5/2010 | Von Buren | |
| 2002/0062740 A1 | 5/2002 | Brukov | |
| 2002/0103081 A1 | 8/2002 | Wolff | |
| 2003/0206990 A1 | 11/2003 | Edmondson | |
| 2004/0129924 A1 | 7/2004 | Stark | |
| 2005/0016995 A1 | 1/2005 | Mitamura | |
| 2005/0035116 A1 | 2/2005 | Brown | |
| 2005/0167358 A1 | 8/2005 | Taylor | |
| 2005/0247608 A1 | 11/2005 | Collias | |
| 2005/0248063 A1 | 11/2005 | Oshita | |
| 2005/0260396 A1 | 11/2005 | Taylor | |
| 2006/0043024 A1 | 3/2006 | Taylor | |
| 2006/0197063 A1 | 9/2006 | Tennison | |
| 2007/0222101 A1 | 9/2007 | Stouffer | |
| 2008/0053182 A1 | 3/2008 | Goff | |
| 2008/0118595 A1 | 5/2008 | Hawkes | |
| 2008/0128346 A1 | 6/2008 | Bowers | |
| 2008/0136066 A1 | 6/2008 | Taylor | |
| 2008/0315460 A1 | 12/2008 | Kusano | |
| 2009/0004318 A1 | 1/2009 | Taylor | |
| 2009/0074905 A1 | 3/2009 | Matsen | |
| 2009/0274893 A1 * | 11/2009 | Bommi | B29C 47/6025 428/319.1 |
| 2010/0051607 A1 | 3/2010 | Yang | |
| 2010/0148529 A1 | 6/2010 | Maffeis | |
| 2010/0205798 A1 | 8/2010 | Walker | |
| 2010/0243572 A1 | 9/2010 | Stouffer | |

FOREIGN PATENT DOCUMENTS

| | | |
|---|---|---|
| CN | 201325165 Y | 10/2009 |
| CN | 101734659 | 6/2010 |
| CN | 201497336 | 6/2010 |
| DE | 197 47 757 | 1/1999 |
| DE | 10 2004 015 801 | 8/2006 |
| DE | 10 2007 027 586 | 12/2008 |
| FR | 2474022 | 7/1981 |
| GB | 1 399 597 | 7/1975 |
| JP | 60-68110 | 4/1985 |
| JP | 2006-264103 | 10/2006 |
| JP | 2009-101602 | 5/2009 |
| WO | WO 98/43796 | 10/1998 |
| WO | WO 2006/099873 | 9/2006 |
| WO | WO 2008/142337 | 11/2008 |
| WO | WO 2009/132831 | 11/2009 |
| WO | WO 2010/005306 | 1/2010 |
| WO | WO 2010/056493 | 5/2010 |

OTHER PUBLICATIONS

Moskal, et al., "Internal heat source capacity at inductive heating in desorption step of ETSA process", *International Communications in Heat & Mass Transfer*, vol. 34, pp. 579-586 (2007).

Balkham, "Porous Plastics for use in Filtration", *Filtration & Separation*, vol. 21, Issue 3, pp. 211-213 (1984).

\* cited by examiner

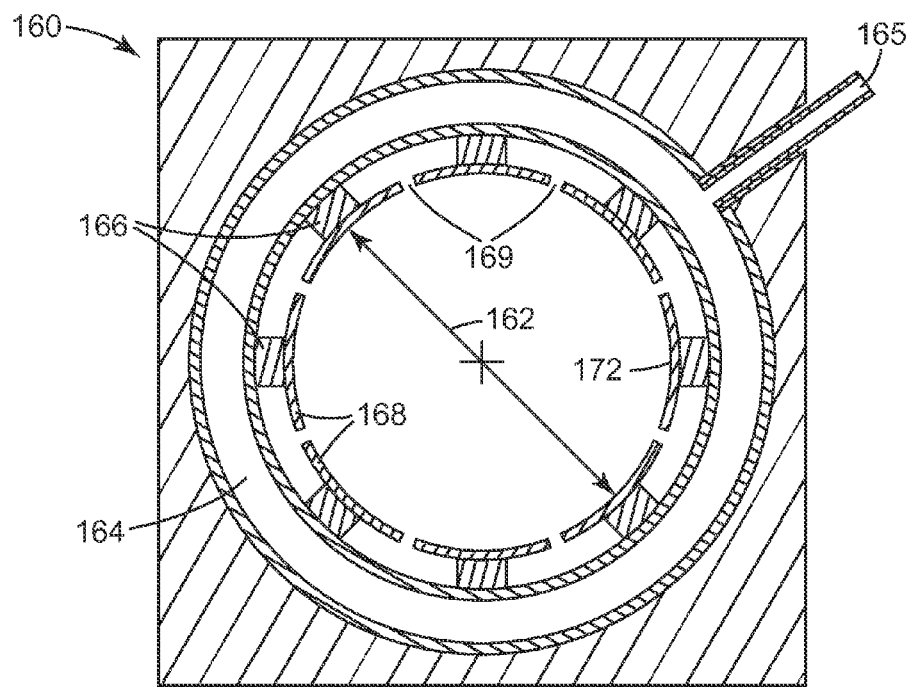
*Fig. 10*
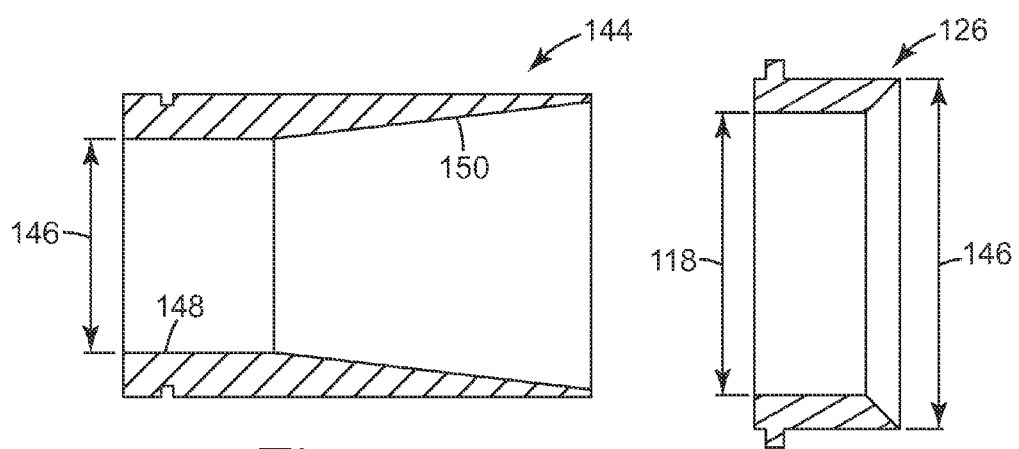
*Fig. 11*  *Fig. 12*

METHOD OF FORMING FILTER ELEMENTS

CROSS REFERENCE TO RELATED APPLICATIONS

This application is a national stage filing under 35 U.S.C. 371 of PCT/US2011/058920, filed Nov. 2, 2011, which claims priority to U.S. Provisional Application No. 61/410,234 filed Nov. 4, 2010, the disclosures of which are incorporated by reference in their entirety herein.

BACKGROUND

It has been known in the fluid filtration field to pass fluids through beds of particulate matter to assist in filtering or separating impurities from the fluid. These particulate beds, which often include adsorbent materials such as activated carbon, may be loose and granular or may be formed into a solid porous block. In either case, a fluid passing through the particulate bed may contact the surfaces of many adsorbent particles where impurities may be attracted and removed. At the same time, particulate impurities in the fluid may be removed by mechanical separation within the pore structure of the particulate bed. One increasingly common application for solid porous blocks is the growing field of drinking water purification. As potential applications for fluid filtration and separation grow and multiply, there is an ongoing need for improved processes and apparatuses for manufacturing solid porous blocks.

SUMMARY OF THE INVENTION

The present disclosure relates to a method of forming a filter element comprising introducing a mixture into a feeder, the mixture comprising a plurality of susceptor particles and a plurality of polymeric binder particles. The mixture is advanced through the feeder and into a die, the die comprising an excitation portion. While advancing the mixture through the excitation portion, eddy currents are induced in the susceptor particles by subjecting the mixture to a high-frequency electromagnetic field, the eddy currents being sufficient to elevate the temperature of the susceptor particles to cause adjacent polymeric binder particles to be heated to at least a softening point. The method further comprises binding the susceptor particles with the heated polymeric binder particles in the die to form a coherent mass, advancing the coherent mass out of the die, and cooling the coherent mass to form the filter element.

Moreover, because the entire cross section of the mixture may be heated at once by direct application of a high frequency electromagnetic field, it is believed that the presently disclosed process may provide filter elements of improved uniformity as compared to filter elements formed by, for example, conductive heating methods.

In the above embodiments, the die may further comprise a variable aperture portion following the excitation portion, and the method further comprises advancing the mixture through the variable aperture portion.

In the above embodiments, the method may further comprise setting an aperture of the variable aperture portion to regulate an extrusion profile of the coherent mass.

In the above embodiments, the excitation portion of the die may comprise a heating tube through which the mixture advances while being subjected to the high-frequency electromagnetic field, the heating tube comprising an electrically insulating material.

In some or all of the above embodiments, the feeder does not cause compression of the mixture.

In the above embodiments, the feeder may comprise a feeder shaft, the feeder shaft comprising an auger portion and a core pin portion extending beyond the auger portion into the die, the method comprising rotating the auger portion to advance the mixture through the feeder, and the core pin forming an internal profile of the coherent mass such that the coherent mass is tubular.

In the above embodiments, the method may further comprise not rotating the core pin portion.

In the above embodiments, the core pin portion may comprise an electrically insulating material.

In the above embodiments, the feeder may comprise a feeder exit positioned adjacent the die, the method comprising disrupting the mixture near the feeder exit to reduce any flow patterns established while advancing the mixture through the feeder.

In the above embodiments, disrupting the mixture may comprise allowing the mixture to expand radially outwardly upon leaving the feeder exit.

In the above embodiments, disrupting the mixture may comprise allowing the mixture to expand radially inwardly upon leaving the feeder exit.

In some or all of the above embodiments, the feeder exit comprises a feeder exit diameter and the die comprises a die entrance portion, wherein the die entrance portion tapers outwardly from the feeder exit diameter.

In some or all of the above embodiments, the feeder comprises a feeder shaft, the feeder shaft comprising an auger portion terminating near the feeder exit and a core pin portion extending beyond the auger portion into the die, the auger portion comprising an auger minor diameter, wherein the core pin portion tapers inwardly from the auger minor diameter.

In the above embodiments, setting the aperture may comprise inflating or deflating one or more bladders surrounding the heated mixture.

In the above embodiments, setting the aperture may comprise positioning a plurality of leaves to surround the heated mixture.

In the above embodiments, positioning the plurality of leaves may comprise actuating one or more actuators connected to one or more of the leaves. In some such embodiments, one or more actuators comprises an inflatable bladder.

In the above embodiments, the high-frequency electromagnetic field may oscillate in a range from about 500 kHz to about 30 MHz.

In some or all of the above embodiments, no heat is provided to the mixture while in the feeder.

In some or all of the above embodiments, no cooling is provided to the mixture while in the feeder.

In some or all of the above embodiments, the susceptor particles comprise activated carbon.

In some or all of the above embodiments, the polymeric binder particles comprise ultra high molecular weight polyethylene.

In the above embodiments, binding the susceptor particles with the heated polymeric binder particles may comprise sintering the mixture such that a coherent mass is formed but polymeric binder does not coat the susceptor particles.

In the above embodiments, the method may comprise forming a plurality of depressions in the extrusion profile as the coherent mass advances through the variable aperture portion.

The present application further discloses filter elements formed by any of the above processes.

The present disclosure further relates to an apparatus for extruding a mixture from an inlet direction to an outlet direction, the apparatus comprising a feeder, a die adjacent the feeder in the outlet direction. The die comprises an excitation portion comprising:

a heating tube comprising an electrically insulating material; and an induction coil surrounding a portion of the heating tube to subject the mixture within the heating tube to a high-frequency electromagnetic field.

In the above embodiments, the die may further comprise a variable aperture portion following the excitation portion.

In some or all of the above embodiments, the feeder does not initiate compression of the mixture.

In some or all of the above embodiments, the feeder comprises a feeder exit comprising a feeder exit diameter and the heating tube comprises a heating tube nominal diameter, wherein the heating tube nominal diameter is larger than the feeder exit diameter by more than 0.010 inches (0.254 mm).

In the above embodiments, the die may comprise a die entrance portion comprising an external transition from the feeder exit diameter to the heating tube nominal diameter.

In the above embodiments, the feeder may comprise a feeder shaft, the feeder shaft comprising an auger portion and a core pin portion extending beyond the auger portion into the die. In some such embodiments, the core pin portion comprises an electrically insulating material.

In some or all of the above embodiments, the auger portion rotates but the core pin portion does not rotate.

In the above embodiments, the auger portion may comprise an auger minor diameter, wherein the core pin portion tapers inwardly from the auger minor diameter. In the above embodiments, the core pin portion may taper inwardly from the auger minor diameter at a rate of at least about 0.001 inches per lineal inch (0.001 mm per lineal mm) in the outlet direction.

In the above embodiments, the heating tube may comprise a constant diameter section and a tapering section downstream from the constant diameter section, the tapering section tapering outwardly in the outlet direction from the constant diameter section to a heating tube maximum diameter.

In the above embodiments, the tapering section may taper outwardly at a rate of at least about 0.002 inches per lineal inch (0.002 mm per lineal mm) in the outlet direction.

In the above embodiments, the variable aperture portion may comprise one or more inflatable bladders to surround the mixture.

In the above embodiments, the variable aperture portion may comprise a forming tube to surround the mixture. In some such embodiments, the variable aperture portion comprises one or more actuators connected to one or more of the leaves. In some such embodiments, one or more of the actuators comprises an inflatable bladder.

In the above embodiments, the high-frequency electromagnetic field may oscillate in a range from about 500 kHz to about 30 MHz.

In some or all of the above embodiments, the feeder is free of heating means.

In some or all of the above embodiments, the feeder is free of cooling means.

In some or all of the above embodiments, the variable aperture portion is dynamically adjustable.

In the above embodiments, the variable aperture portion may comprise an aperture, wherein a plurality of forming protrusions extend inwardly from the aperture.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein:

FIG. 10 is a cross-section view taken at 10-10 of FIG. 2 depicting an exemplary variable aperture portion according to the present disclosure;

FIG. 11 is a cross-section view taken at 3-3 of FIG. 1 depicting an exemplary heating tube according to the present disclosure;

FIG. 12 is a cross-section view taken at 3-3 of FIG. 1 depicting an exemplary external transition according to the present disclosure;

DETAILED DESCRIPTION OF THE DRAWINGS

Figure 15:
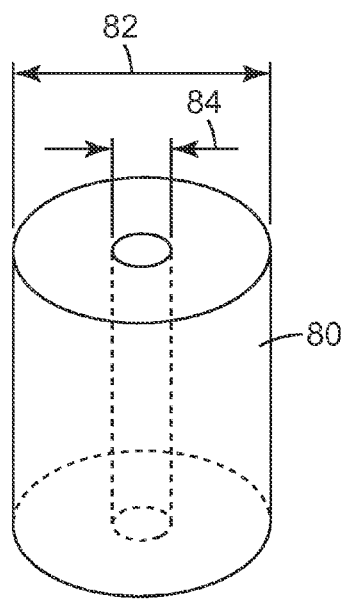
FIG. 15 is a perspective view of an exemplary filter element according to the present disclosure.

The present disclosure provides methods and apparatus 100 for continuously forming filter elements 80, as depicted in FIG. 15, from a mixture 50 comprising susceptor particles 52 and polymeric binder particles 56. Exemplary apparatuses 100 are depicted in FIGS. 1-3, 5, and 8-9. The mixture 50, which may be pre-blended, is typically introduced from a hopper 102 or similar mechanism into a feeder 101. The mixture 50 is then advanced through the feeder 101 into a die 120 comprising an excitation portion 140. While advancing through the excitation portion 140, a high frequency electromagnetic field 152 is applied to the mixture 50. The high frequency electromagnetic field 152 generates eddy currents in the susceptor particles 52. The flow of eddy currents generates sufficient heat in the susceptor particles 52 to raise the temperature of adjacent polymeric binder particles 56 to at least a softening point. The heated susceptor particles 52 then bind with adjacent polymeric binder particles 56 such that the mixture 50 forms a coherent mass 60. The coherent mass 60 is then advanced out of the die 120 to form the filter element 80. Depending on the desired application, the coherent mass 60 may be cooled and cut to length by a cutter 196 upon exiting the die 120 to form the filter element 80. Mixtures 50 and filter elements 80 formed according to the present disclosure may include, but are not limited to, mixtures 50, filter elements 80, and media as shown and described in U.S. Pat. Nos. 7,112,280; 7,112,272; and 7,169,304 to Hughes et al., the disclosures of which are hereby incorporated by reference in their entirety.

The presently disclosed process can provide faster extrusion rates as compared to, for example, conductive heating methods, where heat originating from a barrel or jacket surrounding a mixture must be conducted across the entire cross section of the mixture 50 before the mixture can completely bind. Such reliance on conduction from a barrel or jacket typically requires relatively long exposure time to a heating section in order to provide sufficient time to fully heat the mixture. Longer exposure time could be accomplished either by reducing the extrusion rate or by increasing the physical length of the heating section, both of which are disadvantageous. For example, reducing the extrusion rate is disadvantageous because it typically results in less efficient, and therefore more costly, production. Similarly, increasing the physical length of the heating section is disadvantageous because it can increase the friction generated in the system, eventually to a point where the mixture can bind and effective extrusion becomes impractical. For these reasons, a pure conductive method is likely rate limiting. In comparison, methods according to the present disclosure can fully heat a mixture over a shorter overall length by direct application of a high frequency electromagnetic field to heat the entire cross section of the mixture at once. Because the overall length of the heating section can be made comparatively shorter, faster extrusion rates can be achieved before frictional limits are encountered.

Representations of the process occurring in the excitation portion 140 are depicted, for example, in FIGS. 4, 6, 7a, and 7b. In a typical embodiment, no heat or cooling is applied to the mixture 50 while in the feeder 101, so the mixture 50 may enter the die 120 at room temperature or only slightly elevated above room temperature due to small amounts of heat generated by friction in the feeder 101. Once in the die 120, the mixture 50 of susceptor particles 52 and polymeric binder particles 56 are advanced through the excitation portion 140 where a high frequency electromagnetic field 152 induces eddy currents in the susceptor particles 52. Because the susceptor particles 52 have an inherent electrical resistance, the currents induced in them generate energy that heats the susceptor particles 52.

It should be noted that, although the generation of eddy currents in the susceptor particles 52 is believed to dominate the presently disclosed heating process in the excitation portion 140, some direct heating of the polymeric binder particles 56 may also occur through a process known as dielectric heating. Dielectric heating is a process by which heat is generated in dielectric or electrically insulating materials under the influence of a high frequency electromagnetic field 152. Unlike the generation of eddy currents in electrically conductive materials, however, dielectric heating results from the flipping of electrical dipole moments in the dielectrics they try to align themselves with the alternating electromagnetic field.

Figure 7A:
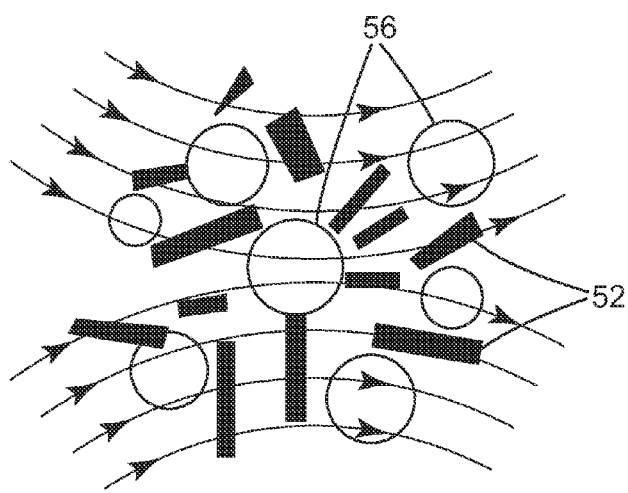
FIG. 7a is a detailed schematic view of the cross-section of FIG. 6 depicting an exemplary mixture being subjected to a high frequency electromagnetic field according to the present disclosure.
Figure 7B:
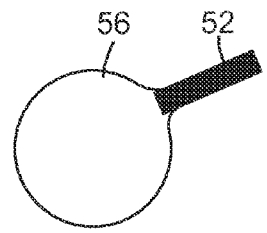
FIG. 7b is a detailed schematic view of an exemplary susceptor particle binding to an adjacent polymeric binder particle according to the present disclosure.

Because the mixture 50 is sufficiently compacted while advancing through the die 120, the susceptor particles 52 tend to be in physical contact with one or more neighboring polymeric binder particles 56. The heat generated in the susceptor particles 52 is sufficient to cause conductive heating of neighboring polymeric binder particles 56 at the points of physical contact. This conductive heating is in turn sufficient to cause the polymeric binder particles 56 to be heated to at least a softening point to cause binding with the contacting susceptor particles 52. Such binding may take many forms depending on the chosen materials and desired application. One example of such binding is schematically represented in FIG. 7b.

In one embodiment, the high frequency electromagnetic field 152 in the excitation portion 140 of the die 120 is generated by an induction coil 154 surrounding a heating tube 144. Typically, the induction coil 154 comprises a circular wound coil and the heating tube 144 comprises a hollow cylinder, the induction coil 154 encircling the heating tube 144 for a set number of turns. The number of turns may be, for example, 2, 3, 4, 5, 6, or more depending on the length of the heating tube 144 and the desired field. It is also envisioned that the induction coil 154 may comprise a more complex surrounding shape that does not strictly encircle the heating tube 144. For example, where other structures may interfere with an encircling induction coil 154, complex bends may be provided in the coil to avoid the interfering structure while still providing a high frequency electromagnetic field 152 suitable for heating the mixture 50 as presently disclosed.

Typically, the induction coil 154 is driven by a high frequency power supply 155 capable of setting up a high frequency alternating current in the coil—typically in a range from about 500 kHz to about 30 MHz., including about 1 MHz, 2 MHz, 4 MHz, 6 MHz, 8 MHz, 10 MHz, 12 MHz, 14 MHz, 16 MHz, 18 MHz, 20 MHz and all frequencies and ranges of frequencies between. Higher frequencies are also envisioned, provided eddy currents can be effectively induced in the susceptor particles 52 such that sufficient heating occurs.

The power used by the induction coil 154 may vary depending on, for example, the dimensions of the heating tube 144, the cross-sectional dimensions of the mixture 50 as it passes through the excitation portion 140, the contents of the mixture 50, and the speed of extrusion. In one embodiment, the induction coil 154 may use an amount of power in a range from about 700 Watts to about 2000 Watts during the process, although much higher power levels are envisioned depending on, for example, the desired overall extrusion rate.

Figure 4:
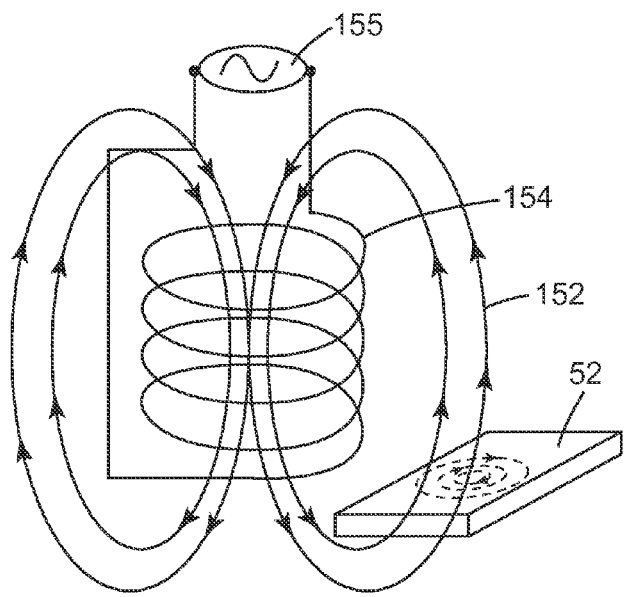
FIG. 4 is a schematic view of inducing eddy currents in an susceptor particle according to the present invention.

FIG. 4 is a schematic representation of a high frequency power supply 155 connected to an induction coil 154 to cause the induction coil 154 to generate a high frequency electromagnetic field 152. As represented in FIG. 4, a high frequency electromagnetic field 152 can interact with susceptor particles 52 to induce eddy currents in the particles, thus resulting in resistive heating of the particles as described. It should be noted that FIG. 4 is provided merely to assist in explaining the mechanism of inductive heating, and is not intended to show the actual location of particles relative to the induction coil 154.

When relatively faster overall extrusion rates are desired, the mixture 50 tends to spend less time in the excitation portion 140. Therefore, it may be necessary in such cases to provide greater power to the excitation portion 140 in order to fully heat the susceptor particles 52 and bind the coherent mass 60 in less time. In some embodiments, the extrusion rate for the presently disclosed process is in a range from about 1 inch per minute (about 2.5 cm per minute) to about 30 inches per minute (about 76 cm per minute), more preferably in a range from about 5 inches per minute (about 12.7 cm per minute) to about 30 inches per minute (about 76 cm per minute). It is generally envisioned that extrusions having a relatively smaller cross-section (i.e., a smaller extrusion profile 82 and/or internal profile 84 where applicable) may be extruded at faster rates than those having larger cross sections.

Figure 3:
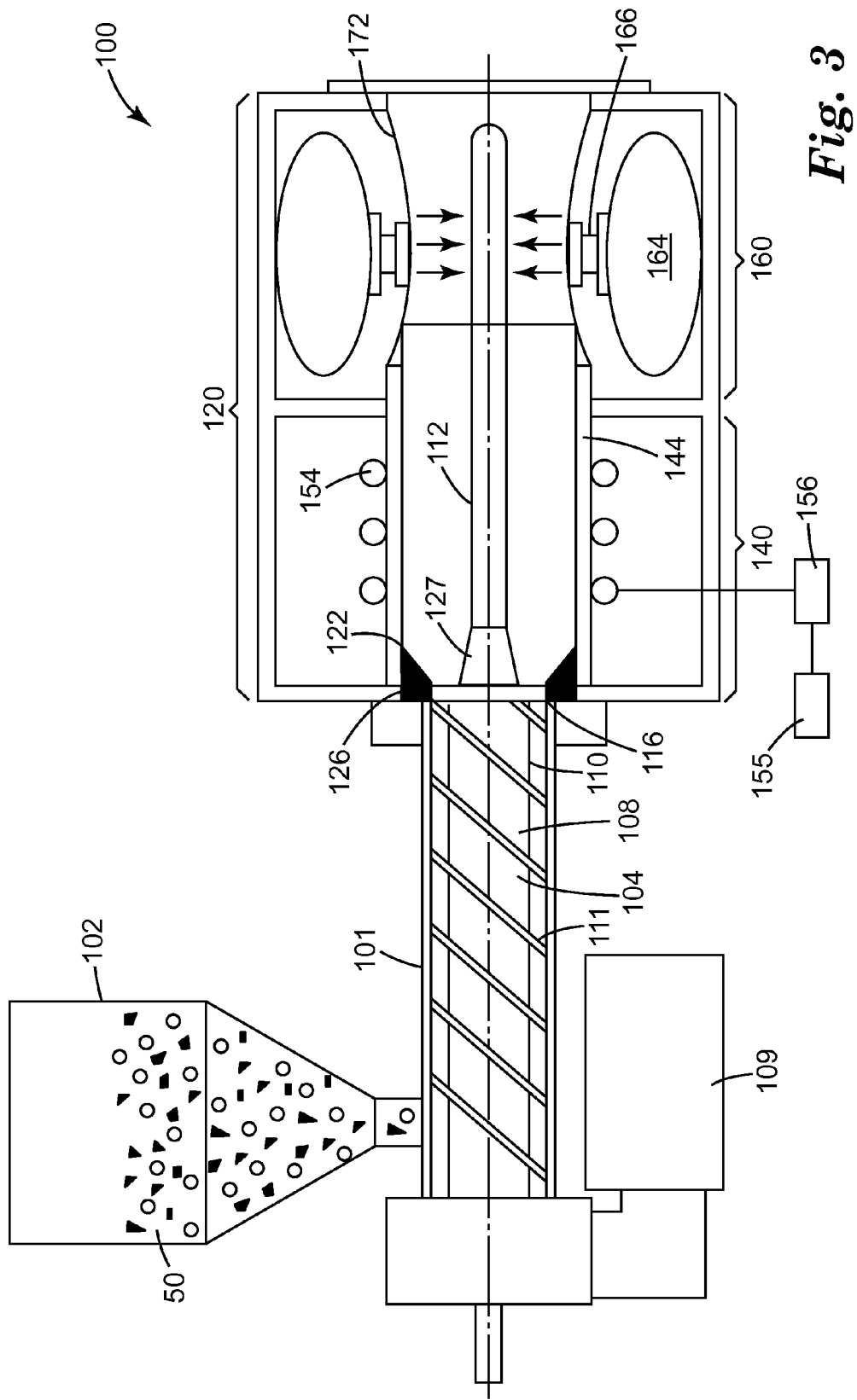
FIG. 3 is a schematic cross-section view taken at 3-3 of FIG. 1 depicting an exemplary apparatus for forming filter elements according to the present disclosure.

In one embodiment, as depicted in FIG. 3, the high frequency power supply 155 is paired with an impedance matching network 156 that works to maximize absorption of power output from the induction coil 154. Generally, the matching network 156 adjusts its capacitor and inductor positions to match the impedance of the induction coil 154 and power supply to that of the mixture 50 being heated to maximize the mixture 50's absorption of applied power.

In such embodiments, because the electromagnetic field generated by the induction coil 154 must penetrate the mixture 50 advancing through the interior of the heating tube 144, the heating tube 144 should be constructed of a material that does not hinder successful passage of the electromagnetic field. In other words, the heating tube 144 should be largely transparent to the electromagnetic field, with the exception of possible minor dielectric heating, as described above.

In addition to relative transparency to the electromagnetic field, a heating tube 144 material desirable for a given application may further exhibit, for example, a high dielectric strength, a high volume resistivity, a low dissipation factor at high frequencies ($\sim 10^6$ Hz), a high continuous operating temperature, a high heat deflection temperature, and good manufacturability. These properties are considered in turn below.

First, a sufficiently high dielectric strength can reduce the tendency of the heating tube 144 to break down under high voltages that may be generated across it within the excitation portion 140. In one embodiment, the heating tube 144 is constructed of a material having a dielectric strength of at least about 6 kV/mm, more preferably at least about 15 kV/mm, and even more preferably at least about 20 kV/mm.

Next, a sufficiently high volume resistivity can prevent the flow of electrical current through the material even under high voltages that may be generated across it within the excitation portion 140. In one embodiment, the heating tube 144 is constructed of a material having a volume resistivity of at least about $1 \times 10^{13}$ ohm·cm, more preferably at least about $1 \times 10^{14}$ ohm·cm, and even more preferably at least about $1 \times 10^{15}$ ohm·cm.

Next, a low dissipation factor can help prevent the heating tube 144 material from heating up, and thus sapping energy from the high frequency electromagnetic field 152, due to oscillating voltages applied across it. The dissipation factor—often expressed as a percentage—is a measure of the degree of loss of electric power in a dielectric material. In the context of electrical capacitors, which often contain dielectric materials, a low dissipation factor corresponds to a quality capacitor, while a high dissipation factor corresponds to a poor capacitor. In one embodiment, the heating tube 144 is constructed of a material having a dissipation factor of less than or equal to about 0.05 percent at $10^6$ Hz, and more preferably less than or equal to about 0.005 percent at $10^6$ Hz.

Next, high temperature resistance can help prevent the heating tube 144 material from yielding or otherwise deforming under prolonged high temperature conditions. Because the heating tube 144 may be subjected to prolonged temperature above 350 degree Fahrenheit (177 degrees Celsius), it is desirable for a heating tube 144 material to begin to yield or deform at substantially higher temperatures. Typical temperatures generated in the excitation portion 140 of the die 120 may range from about 350 degrees Fahrenheit (about 177 degrees Celsius) to about 450 degrees Fahrenheit (about 232 degrees Celsius). Other temperature ranges are possible depending, for example, on the heat needed to raise the temperature of the given polymeric binder particles 56 above a softening point. Because the extrusion process contemplated by the present disclosure may be continuous, the heating tube 144 may be continuously exposed to such elevated temperatures. In one embodiment, the heating tube 144 is constructed of a material having a continuous operating temperature and/or heat deflection temperature of at least about 450 degrees Fahrenheit (about 232 degrees Celsius), more preferably of at least about 500 degrees Fahrenheit (about 260 degrees Celsius), and even more preferably of at least about 572 degrees Fahrenheit (about 300 degrees Celsius), Furthermore, good manufacturability can allow a heating tube 144 to be precision manufactured to have tightly controlled geometry and quality surfaces finishes. Typically, such features are best attained through machining processes. Therefore, it is desirable for a heating tube 144 material to be reasonably susceptible to machining techniques. It should also be noted that the heating tube 144 may be molded so long as the material employed is susceptible to molding techniques.

In consideration of some or all of the above criteria, materials that may be useful for use as a heating tube 144 include, but are not limited to, glass, ceramic, glass ceramic, glass filled ceramic, polytetrafluoroethylene, glass filled polytetrafluoroethylene, glass filled liquid crystal polymer, polybenzimidazole, polyaramid, polyetherimide, polyphthalamide, polyphenylene sulfide, polyetheretherketone, alumina silicate, and silicone.

In some embodiments, the heating tube 144 comprises a heating tube nominal diameter 146 that is constant along the axial length of the heating tube 144. However, it may be desirable in some embodiments to provide the heating tube 144 with a constant diameter section 148 and a tapering section 150, as depicted in FIG. 11. In such embodiments, the diameter of the constant diameter section 148 is the heating tube nominal diameter 146, while the tapering section 150 may taper outwardly from the heating tube nominal diameter 146 in the outlet direction 20. In one such embodiment, the tapering section 150 tapers outwardly at a rate of at least about 0.002 inches per lineal inch (0.002 mm per lineal mm) in the outlet direction 20. In other embodiments, the heating tube 144 comprises no constant diameter section 148; in such embodiments the entire heating tube 144 comprises a tapering section 150. In such embodiments, similar taper rates are envisioned as where a constant diameter section 148 is provided. Provision of a tapering section 150 as described can assist in relieving frictional forces that may develop in the die 120 as the mixture 50 is formed into a coherent mass 60, thereby helping to prevent the coherent mass 60 from binding in the die 120 as it progresses through the apparatus 100.

In some embodiments, the susceptor particles 52 comprise adsorbent susceptor particles 52. In some embodiments, the adsorbent susceptor particles 52 comprise activated carbon. However, the susceptor particles 52 may comprise any particles that are suitable or compatible for a given end use—typically fluid purification—and are capable of being heated by internal induction of eddy currents under the influence of a high frequency electromagnetic field 152. Generally, the susceptor particles 52 will be electrical conductors or semiconductors and will not be electrical insulators. Examples of electrical conductors include, but are not limited to, silver, copper, gold, aluminum, iron, steel, brass, bronze, mercury, graphite, and the like. Examples of electrical insulators include, but are not limited to, glass, rubber, fiberglass, porcelain, ceramic, quartz, and the like. Generally, susceptor particles 52 with higher inherent electrical resistance can heat up more quickly as eddy currents flow. For example, iron can heat more quickly than copper under the influence of a high frequency electromagnetic field 152. Some, but not all, materials exhibit an increase in electrical resistance as their temperatures are elevated and thus may heat at a higher rate as their temperatures are raised in the excitation portion 140. In some embodiments, the susceptor particles 52 have an electrical conductivity equal to or greater than about $1 \times 10^4$ Siemens per meter at 25 degrees Celsius.

In one embodiment, the polymeric binder particles 56 comprise ultra high molecular weight polyethylene (UHMW). UHMW is well suited to the present application, for example, because of its tendency not to melt flow even at temperatures well above the softening point. Rather than melt flow, UHMW tends to merely soften and become adherent when heated above the softening point. As a result, UHMW allows the formation of a coherent mass 60 wherein individual susceptor particles 52 bind to the polymeric binder particles 56 through a form of forced point bonding or sintering. A representative example of such forced point bonding or sintering is shown in FIG. 7b, where a single susceptor particle is shown bound to a single polymeric binder particle. In such a configuration, the polymeric binder particles 56 bind the susceptor particles 52 together without melt flowing to coat the surface of the susceptor particles 52 with polymeric binder. In certain applications, particularly where the susceptor particles 52 perform an active purification function, such prevention of coating is important in order to keep active particulate surfaces available for contact with the filtrate. While UHMW is a desirable material for the polymeric binder particles 56, it should be understood that other polymers capable of being processed to cause forced point bonding as described above should also be useful.

In some embodiments, particularly where the forced point bonding or sintering result described above is not critical, other polymers may be employed as polymeric binder particles 56.

In one embodiment, the polymeric binder particles 56 are plasma treated before processing to form a coherent mass 60. Plasma treatment of the polymeric binder particles 56 can impart desirable performance characteristics to filter elements 80 formed from the coherent mass 60. For example, improved wettability and improved initial flowability may result. Moreover, it may be possible to form filter elements 80 having relatively thinner walls with the use of plasma treated polymeric binder particles 56. Other surface treatments of polymeric binder particles 56 are also envisioned, for example, grafting or surface modification to create or enhance antimicrobial properties or affinity for particular substances. Examples of such treatment of particles suitable for polymeric binder particles 56, including UHMW, is described, for example, in U.S. Pat. Pub. No. 2010/0243572 A1 to Stouffer, et. al. Particular benefits of such treatments are described, for example, in paragraphs [0032] through [0043] of Stouffer et al., the disclosure of which is incorporated herein by reference in its entirety.

In some embodiments, one or more additives may accompany the mixture 50. For example, lead or arsenic reduction components, including those in particulate form, may be added to the mixture 50. In one embodiment, silver may be added to the mixture 50 to help prevent bacteria growth in the formed filter elements 80. In such embodiments, silver or other metal or highly conductive particles may be included to comprise at least a portion of the susceptor particles 52. For purposes of the present disclosure, a highly conductive susceptor particle has an electrical conductivity equal to or greater than about $0.5 \times 10^6$ Siemens per meter at 25 degrees Celsius. Because some highly conductive materials can heat more quickly under the influence of a high frequency electromagnetic field 152, it is envisioned that the inclusion of such highly conductive susceptor particles 52 in the mixture 50 may serve to accelerate heating of the mixture 50 and therefore could be useful in providing increased extrusion rates. In one embodiment, highly conductive susceptor particles 52 may be combined with activated carbon susceptor particles 52 to comprise a mixture 50 that may be more quickly heated than a mixture 50 where the susceptor particles 52 comprise activated carbon alone.

Filter elements 80 formed according to the present disclosure, whether used alone or in combination with other separation devices or media, may be useful in widely varied fluid purification and separation applications, including, but not limited to, drinking water and other fluid purification, including the reduction of sediment, lead, arsenic, bacteria, viruses, chlorine, and volatile organic compounds.

A feeder 101 according to the present disclosure may be any apparatus 100 capable of advancing a mixture 50 into the die 120. Exemplary feeders include, but are not limited to, augers and rams. It should be noted that an apparatus 100 according the present disclosure may be set up to form, among other profiles, a solid cylindrical coherent mass 60 or a tubular coherent mass 60. Where a tubular coherent mass 60 is desired, a core pin portion 112 is typically employed to assist in forming an internal profile 84 of the tubular profile.

In some embodiments, such as those depicted in FIGS. 3, 5, 8, and 9, the feeder 101 comprises a feeder shaft 104 comprising an auger portion 108 and a core pin portion 112. The auger portion 108 is typically driven by an auger motor 109 or other means for driving rotation of the auger. Typically, the auger portion 108 comprises a series of screw flights 111 that extend through the feeder 101 but terminate at or before the feeder exit 116. The core pin portion 112, however, extends beyond the feeder exit 116 and into the die 120. In such embodiments, the core pin portion 112 may extend entirely through the die 120 or through only a portion of the die 120. Typically, the core pin portion 112 comprises a smooth cylindrical profile, although such profile may comprise a portion that is tapered inwardly in the outlet direction 20. In one such embodiment, the core pin may comprise a portion that tapers inwardly at a rate of, for example, at least about 0.001 inches per lineal inch (0.001 mm per lineal mm) in the outlet direction 20. Such an inward taper of the core pin can assist in relieving frictional forces that may develop in the die 120 as the mixture 50 is formed into a coherent mass 60, thereby helping to prevent the coherent mass 60 from binding in the die 120 as it progresses through the apparatus 100.

In some embodiments, the core pin portion 112 comprises a material that is transparent to the high frequency electromagnetic field 152. In such embodiments, exemplary materials for the core pin portion 112 may be the same or similar to those listed above for use in the heating tube 144. The choice of such material can be important when it is desired to prevent the core pin portion 112 from inductively heating under the influence of the high frequency electromagnetic field 152 and thus conductively heating the internal profile 84 of the coherent mass 60. For example, it is envisioned that provision of an electrically conductive core pin portion 112 in the disclosed processes could result in inductively heating the core pin portion 112 such that materials in the mixture 50 could be heated beyond appropriate working temperatures. Not only could such core pin portion 112 heating alter the formation of the coherent mass 60, but it could also result in wasted energy due to the high frequency power absorbed by the electrically conductive material rather than directly by the mixture 50 itself. However, depending on the materials employed in the mixture 50 and the desired characteristics of the filter element 80, it may be permissible or even desirable to construct the core pin portion 112 from a material that can heated through the induction of eddy currents.

Figure 8:
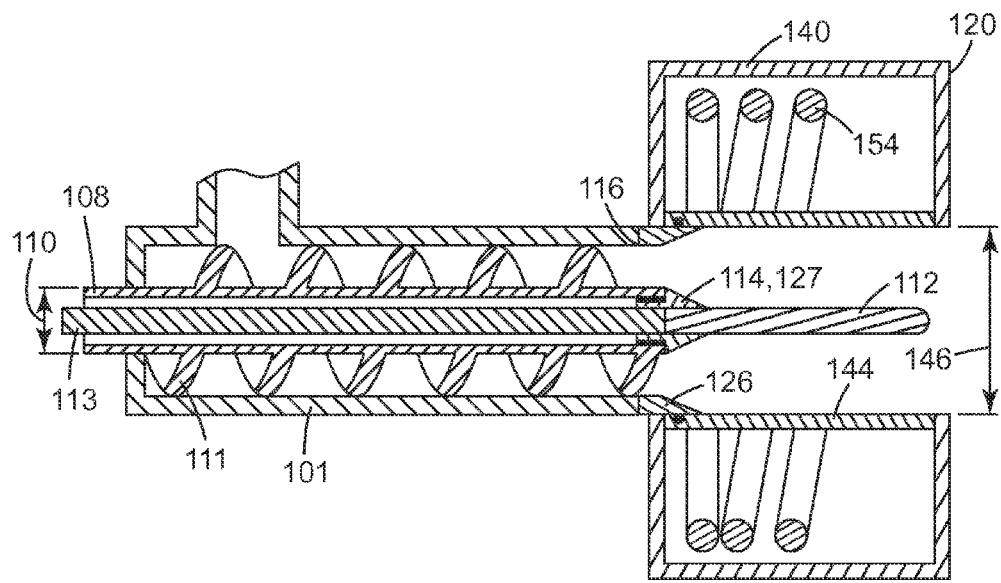
FIGS. 8 and 9 are cross-section views taken at 3-3 of FIG. 1 depicting exemplary apparatuses for forming filter elements according to the present disclosure.

In some embodiments, such as the one shown in FIG. 8, the core pin portion 112 rotates independently of the auger portion 108 or, alternatively, does not rotate while the auger portion 108 rotates. In such embodiments, the core-pin portion may be fixed to an independent shaft from the auger portion 108. In one embodiment, the independent shafts comprise coaxial shafts wherein the auger portion 108 comprises a rotatable tubular sleeve coaxially surrounding a fixed core pin shaft 113, the fixed core pin shaft 113 holding the core pin portion 112 against rotation while the auger portion 108 rotates about it. In such embodiments, the fixed core pin shaft 113 may comprise the same or different material from the core pin portion 112. Where the fixed core pin shaft 113 and the core pin portion 112 comprise different materials, a core pin collar 114 may be employed to connect the two end to end. A bushing may be provided between the auger portion 108 and the core pin portion 112 to provide reduced friction and rotational support to the auger portion 108. In one embodiment, the core pin portion 112 comprises an electrically insulating material while the fixed core pin shaft 113 comprises a metallic material such as steel. It may be desirable to prevent the core pin portion 112 from rotating to, for example, reduce the relative motion of the coherent mass 60 and the core pin portion 112 as the coherent mass 60 advances through the die 120. This reduction in relative motion may be effective to reduce "skinning" or "polishing" effects that could reduce the porosity or uniformity of the surface of the internal profile 84 of filter elements 80 formed by the disclosed processes. Unless reduced or prevented, reduced porosity or lack of uniformity could result in reduced flow rates, increased pressure drops, of uneven utilization of the filtration media.

In some embodiments, the feeder 101 does not apply compression to the mixture 50 as the mixture 50 advances through the feeder 101. In one embodiment, the feeder 101 comprises a feeder shaft 104 comprising an auger portion 108. The auger portion 108 may comprise a series of screw flights 111 of a particular pitch. In the case where such an auger does not apply compression to the mixture 50, the pitch of the screw flights 111 may be chosen to be constant along the auger portion 108, as is shown in FIGS. 3, 5, 8, and 9. As a further or alternative way to reduce or eliminate compression of the mixture 50 in the feeder 101, the auger minor diameter may be constructed to taper radially inwardly in the outlet direction 20 over part or all of the auger portion 108. In one such embodiment, the auger portion 108 may comprise an auger minor diameter that tapers inwardly at a rate of, for example, at least about 0.001 inches per lineal inch (0.001 mm per lineal mm) in the outlet direction 20.

In other embodiments not shown in the figures, the feeder 101 applies some degree of compression to the mixture 50 as the mixture 50 advances through the feeder 101. In such embodiments, the feeder 101 may comprise an auger portion 108 having a series of screw flights 111 of decreasing pitch along the auger portion 108, the decreasing pitch having a tendency to compress the mixture 50 as the mixture 50 progresses in the outlet direction 20. In another embodiment, the auger portion 108 may comprise screw flights 111 of constant or differing pitch that are split into two or more independently rotating auger sections. In such embodiments, an auger section positioned further in the outlet direction 20 may rotate at a slower rate than an auger section positioned further in the inlet direction 10, the slower rotation having a tendency to compress the mixture 50 as the mixture 50 progresses in the outlet direction 20. In yet another embodiment, the feeder 101 may comprise a feeder 101 outer cross-section that tapers inwardly in the outlet direction 20. In one such embodiment, the feeder 101 may comprise a portion that tapers inwardly at a rate of, for example, at least about 0.001 inches per lineal inch (0.001 mm per lineal mm) in the outlet direction 20. Alternatively, or in addition, the auger minor diameter may be constructed to taper radially outwardly in the outlet direction 20 over part or all of the auger portion 108 to increase compression of the mixture 50 in the feeder 101. In one such embodiment, the auger portion 108 may comprise an auger minor diameter that tapers outwardly at a rate of, for example, at least about 0.001 inches per lineal inch (0.001 mm per lineal mm) in the outlet direction 20.

In one embodiment, the feeder 101 comprises a feeder exit 116 that is generally located at an end of the feeder 101 most proximal to the outlet direction 20. The feeder exit 116 is typically where the mixture 50 leaves 168 the feeder 101 and enters the die 120 at a die entrance portion 122, either directly or by passing across an external transition 126, as shown in FIGS. 3, 5, 8, 9, and 12. In some embodiments, it may be advantageous to disrupt the flow of the mixture 50 as it leaves 168 the feeder 101 and enters the die 120 in order to reduce or eliminate any flow patterns that may have set up while the mixture 50 was advancing through the feeder 101. Such flow patterns may be caused, for example, by helical screw flights 111 employed in an auger-type feeder 101. Where such patterns are set up, and where the flow of the mixture 50 is not disrupted, the coherent mass 60, and thus the filter element 80, may exhibit such patterns. Such patterns may simply manifest as aesthetic flaws in the visible surfaces of the coherent mass 60, but may also result in discontinuities in the porosity of the coherent mass 60. Such discontinuities may contribute to undesirable flow characteristics that could lead to, for example, increased pressure drop or premature or uneven loading of the filter element 80 in use.

In one embodiment, flow of the mixture 50 is disrupted at or near the feeder exit 116 by increasing the diameter of the heating tube 144 relative to the feeder exit 116 diameter 118. In one embodiment, the heating tube nominal diameter 146 is larger than the feeder exit 116 diameter by more than 0.010 inches (0.254 mm). In some embodiments, the heating tube nominal diameter 146 is larger than the feeder exit 116 diameter by more than 0.050 inches (1.27 mm), or even 0.10 inches (2.54 mm). Such an increase in diameter may be implemented by forming an integral external transition 126 into either or both of the feeder 101 or the heating tube 144. Alternatively, as shown in the figures, at least a portion of the external transition 126 may be formed by an independent member serving to transition from the feeder exit 116 diameter 118 to a larger diameter in the heating tube 144. The external transition 126 can allow the mixture 50 to expand radially outwardly as it enters the heating tube 144 in order to disrupt any flow patterns that may have been set up in the feeder 101.

Figure 5:
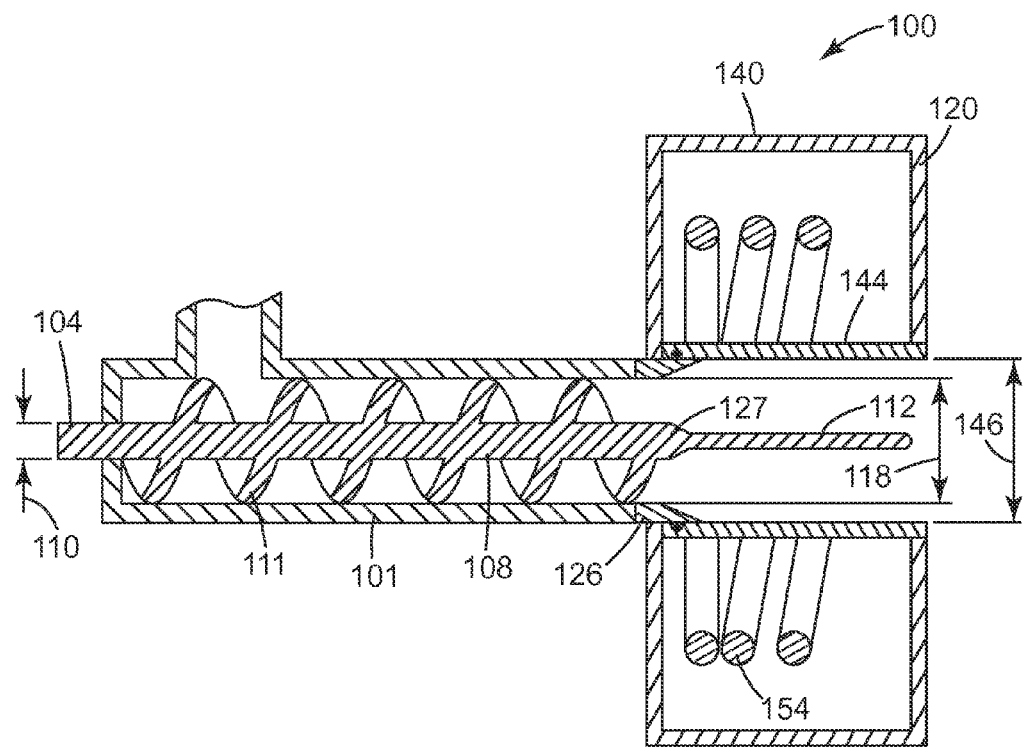
FIG. 5 is a cross-section view taken at 3-3 of FIG. 1 depicting an exemplary apparatus for forming filter elements according to the present disclosure.
Figure 6:
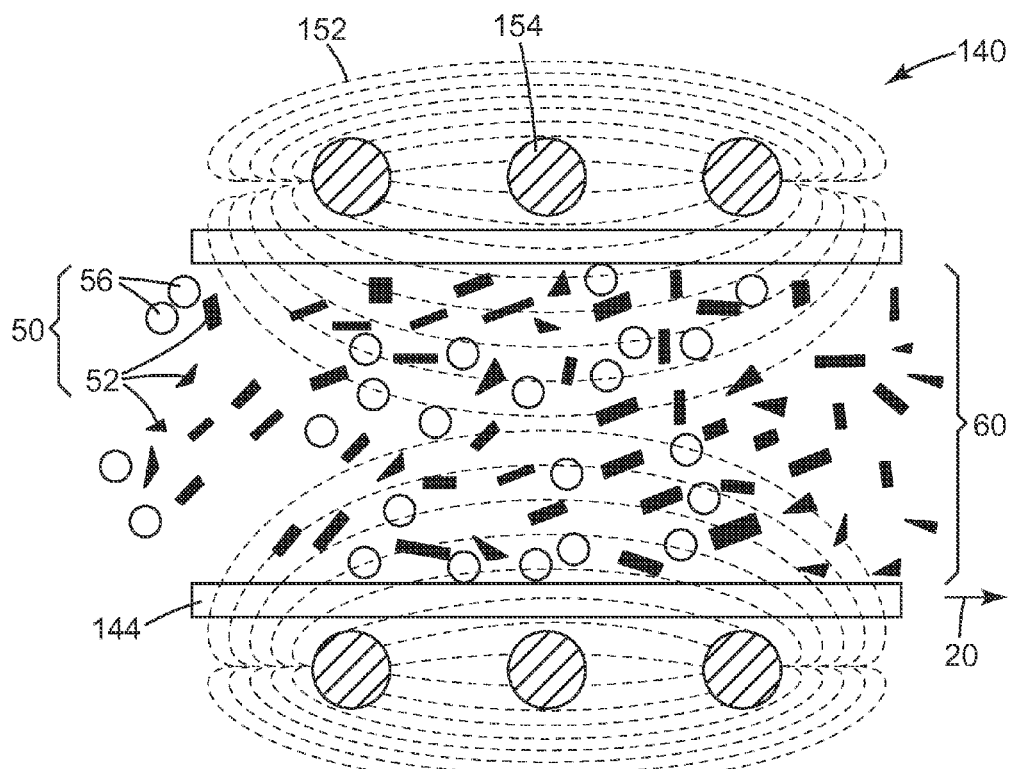
FIG. 6 is a detailed schematic cross-section view taken at 3-3 of FIG. 1 depicting an exemplary mixture being advanced through the excitation portion of a die according to the present disclosure.
Figure 9:
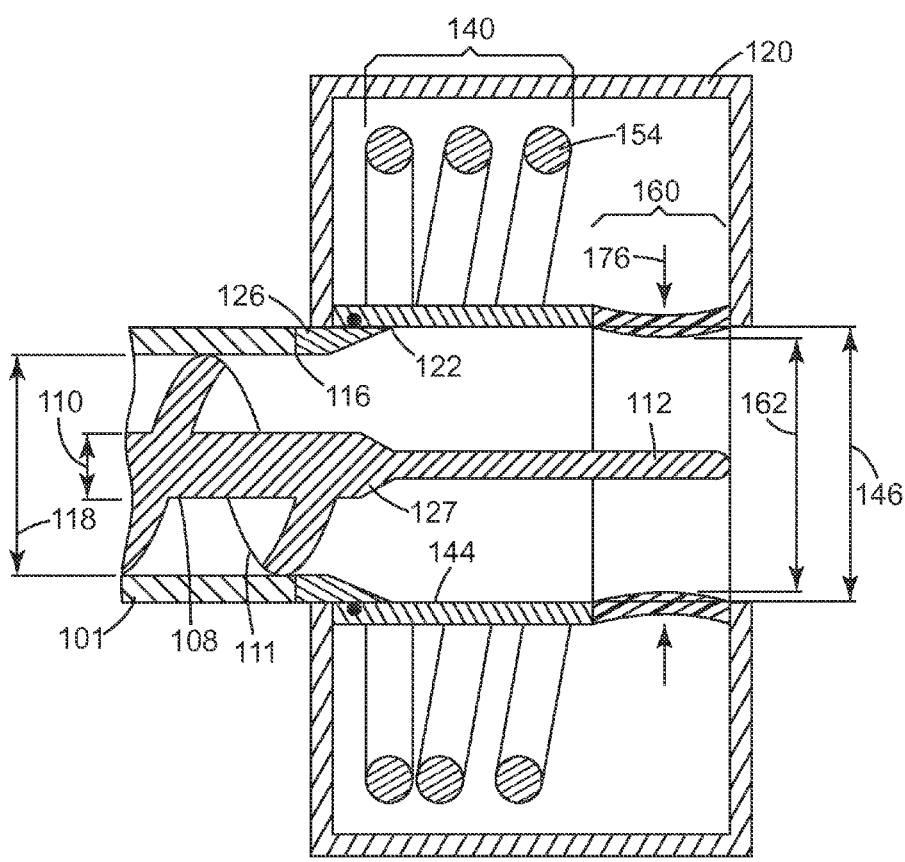

In some embodiments, particularly where an auger-type feeder 101 is employed, the flow of the mixture 50 is disrupted at or near the feeder exit 116 by decreasing the profile of the core pin portion 112 relative to the auger minor diameter 110, as shown in FIGS. 3, 5, 8, and 9. Such a decrease in size may be implemented by forming an integral internal transition 127 into either or both of the auger portion 108 or the core pin portion 112, as shown in FIGS. 5 and 9. Alternatively, at least a portion of the internal transition 127 may be formed by a core pin collar 114 serving to transition from the auger minor diameter 110 to a smaller profile on the core pin portion 112, as shown in FIG. 8. The internal transition 127 can allow the mixture 50 to expand radially inwardly as it enters the heating tube 144 in order to disrupt any flow patterns that may have been set up in the feeder 101.

In some embodiments, as shown in FIGS. 2, 3, 9, and 10, the die 120 further comprises a variable aperture portion 160 positioned downstream of the excitation portion 140. Typically, although not necessarily, the variable aperture portion 160 is positioned directly adjacent the heating tube 144 in the outlet direction 20. The variable aperture portion 160 comprises an aperture 162 that can be set to regulate an extrusion profile 82 of the coherent mass 60. The aperture 162 may be adjusted as desired to provide static or dynamic regulation of the extrusion profile 82.

Provision of a variable aperture portion 160 within the die 120 can allow the extrusion profile 82 to be adjusted while also providing a mechanism to control the porosity of the coherent mass 60 as it exits the die 120. For example, in one embodiment, reducing the aperture 162 of the variable aperture portion 160 can effectively compact the coherent mass 60 into a smaller extrusion profile 82, thus compacting the coherent mass 60 to achieve the desired porosity. Because the variable aperture portion 160 is adjustable, die 120 parameters may be varied to accommodate a wide range of mixtures 50 or, for example, the production of filter elements 80 having differing porosities, without a need to re-tool or change dies.

In some embodiments, the variable aperture portion 160 is effective to form a cylindrical cross section in the coherent mass 60. In some embodiments, the variable aperture portion 160 is effective to form a non-cylindrical cross section in the coherent mass 60. For example, the variable aperture portion 160 may be configured to form the cross section of the coherent mass 60 into an ellipse or oval. In other embodiments, the variable aperture portion 160 may be configured to form the cross section of the coherent mass 60 into a rectangle, a triangle, or other polygon. Such cross sections may or may not comprise rounded edges between polygon sides. In some embodiments, the heating tube 144 is cylindrical in cross section, while the variable aperture portion 160 forms a non-cylindrical cross section. In some embodiments, a core pin portion 112 provides a cylindrical internal profile 84 while the extrusion profile 82 is formed into a non-cylindrical cross section. In some embodiments, a core pin portion 112 provides a non-cylindrical internal profile 84 and the extrusion profile 82 is formed into a non-cylindrical cross section.

In some embodiments, such as those depicted in FIGS. 3 and 10, the variable aperture portion 160 comprises one or more bladders 164 that are inflatable to adjust the aperture 162. A bladder may be inflated or deflated by provision of one or more fluid lines 165 connecting the bladder to an external fluid source controllable to adjust the fluid pressure. Any fluid may be suitable depending on the desired interaction of the bladder with the advancing coherent mass 60. In embodiments where a degree of cushioning is desired, it may be advisable to use a compressible fluid such as air to pressurize the bladder. Where used, a bladder may or may not bear directly upon the coherent mass 60 as it advances through the die 120.

In embodiments where a bladder bears directly on the coherent mass 60 (not shown), such bladder should desirably be constructed of, coated with, or faced with, a material suitable for withstanding prolonged abrasion of the bladder surface against the advancing mass.

In embodiments where a bladder does not bear directly upon the coherent mass 60, on or more intermediate members may be interposed between the bladder surface and the coherent mass 60. In some such embodiments, such as those depicted in FIGS. 3 and 10, a forming tube 172 is used to directly bear upon the coherent mass 60, while one or more bladder bears upon the forming tube 172. In such embodiments, the forming tube 172 may be constructed of a more abrasion resistant material than a bladder, and may thus provide the die 120 with enhanced durability. Suitable materials for the forming tube 172 include, but are not limited to, steel, stainless steel, brass, bronze, aluminum, and polytetrafluoroethylene. The forming tube 172 should be sufficiently pliable to allow adjustment of the aperture 162. It should be understood that the forming tube 172 need not be cylindrical in cross section, and may instead comprise other cross sections as described elsewhere in this disclosure.

In one embodiment, the forming tube 172 is slotted and comprises a plurality of leaves 168 arranged in a tubular fashion. FIG. 10 is illustrative. In such embodiments, the forming tube 172 may comprise any suitable number of leaves 168. In one embodiment, the forming tube 172 comprises a range from four to eight leaves 168, including five, six, or seven leaves 168. The leaves 168 may be independent or attached together at one end or both ends as desirable. In one embodiment, leaves 168 are formed by creating a plurality of longitudinal slots 169 through the walls of a solid tube. Such slots 169 may have a closed perimeter or may be open to one end of the forming tube 172. The presence of leaves 168 can permit greater pliability of the forming tube 172 to facilitate adjustment of the aperture 162.

In one embodiment, the forming tube 172 comprises a pre-formed bottlenecked, or constricted, tube shape, as shown in FIGS. 3 and 9. In some embodiments, the constricted tube-shaped forming tube 172 comprises a plurality of leaves 168 as described above. Provision of a forming tube 172 having a constricted shape can allow the use of more rigid and abrasion resistant tube materials because, for example, the forming tube 172 is essentially "pre-flexed" and thus requires less deflection in order to reduce its aperture 162 to bear upon the advancing coherent mass 60. Moreover, a constricted tube shape can provide both a gentle lead-in and lead-out of the variable aperture portion 160. In some embodiments, it may be important to provide such gentle transitions due to the tendency for the mixture 50 to bind in the die 120 if overly-restricted. A mixture 50 binding in the die 120 could cause severe damage to the apparatus 100 or at least costly process down-time, particularly if the mixture 50 were to cool and harden within the die 120. It should be understood that a constricted tube shaped forming tube 172 need not be cylindrical in cross section, and may instead comprise other cross sections as described elsewhere in this disclosure.

While it is envisioned that a bladder may bear directly upon a forming tube 172, some embodiments may include a further intermediate member to transfer force from the bladder to the forming tube 172. In one such embodiment, one or more buttons 166 are interposed between the bladder and the forming tube 172. In embodiments where the forming tube 172 comprises a plurality of leaves 168, a button may be associated with each of the leaves 168. Provision of one or more buttons 166 may be desirable, for example, where bladder materials are intolerant of prolonged high temperatures because the buttons 166 can space the bladder material a safe distance from the heated coherent mass 60.

In some embodiments, the bladder or die 120 structure adjacent the bladder may be cooled during operation. Such cooling can ensure that the temperature of the bladder does not exceed appropriate working temperature for the bladder material or the fluid within the bladder.

In some embodiments, one or more actuators 176 is used in combination with, or instead of, one or more bladders 164 to provide force to alter the aperture 162, as depicted in FIG. 9. The one or more actuators 176 may comprise, for example, piezoelectric, electromagnetic, pneumatic, or hydraulic actuators 176. Such actuators 176 may, for example, be configured to bear directly upon the advancing coherent mass 60, may include one or more buttons 166 interposed between an actuator and the advancing coherent mass 60, or may bear directly or indirectly upon a forming tube 172, which then bears directly on the advancing coherent mass 60.

Figure 13:
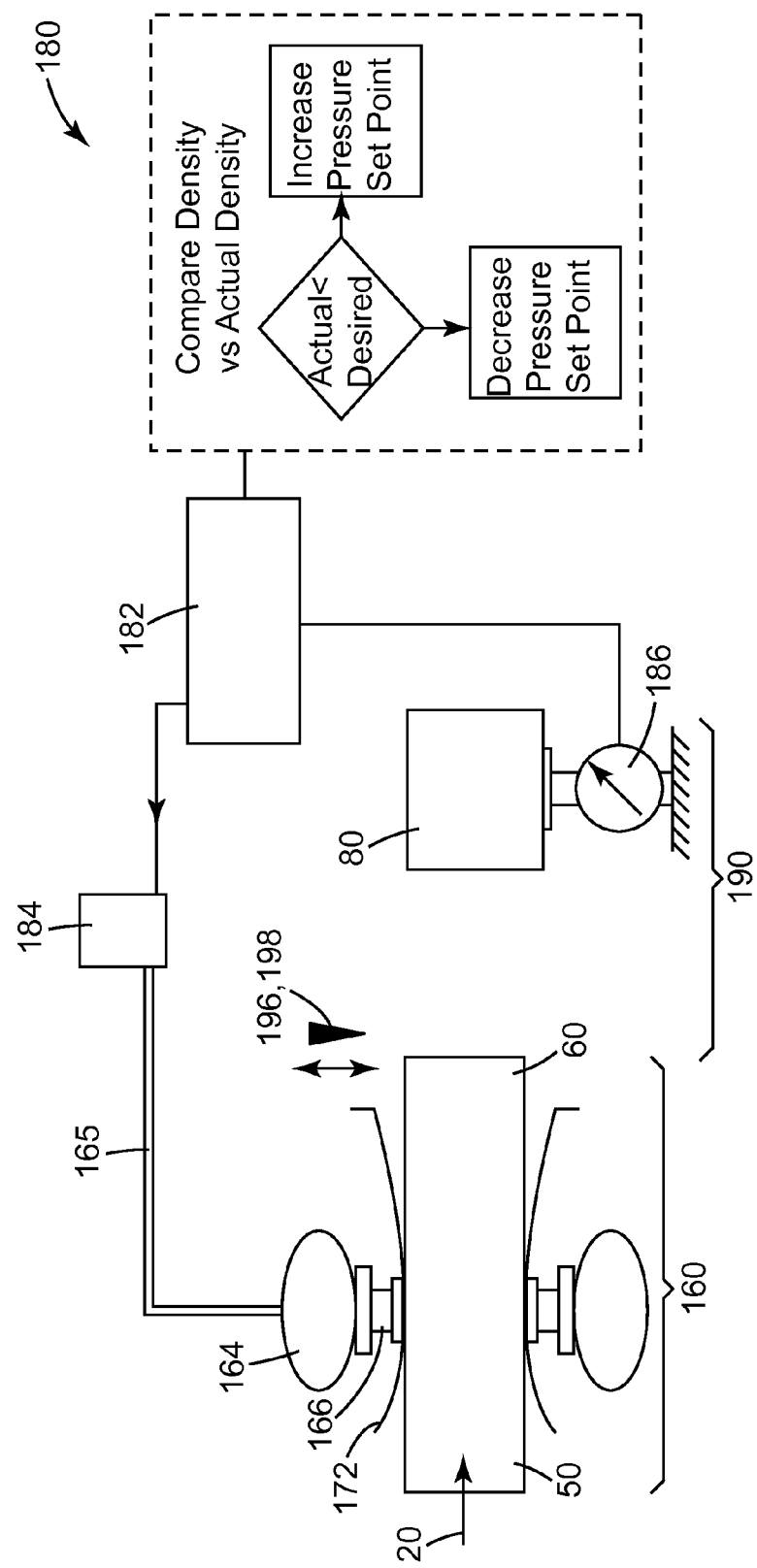
FIG. 13 is a schematic diagram of an exemplary control system for a variable aperture portion according to the present disclosure.

In some embodiments, the variable aperture portion 160 is regulated by an aperture control system 180, as depicted in FIG. 13. In one embodiment, fluid pressure is supplied by a pressure regulator 184 to a bladder in the variable aperture portion 160. The magnitude of pressure applied by the pressure regulator 184 is in turn set by a controller 182. The controller 182 output to the pressure regulator 184 is determined by monitoring the porosity of filter elements 80 formed by the disclosed processes. In one example, filter elements 80 are cut to a fixed length from the coherent mass 60 as it exits the die 120. The filter elements 80 may then be weighed on a scale 186 after cutting. In one embodiment, the controller 182 uses the weight as a proxy to determine a filter element 80 porosity. If the porosity is greater than desired, the controller 182 can instruct the pressure regulator 184 to increase the pressure applied to the bladder, thus decreasing the aperture 162 of the variable aperture portion 160 to further compact the coherent mass 60. Conversely, if the cut filter element 80 is not porous enough, the controller 182 can instruct the pressure regulator 184 to decrease pressure applied to the bladder to increase the aperture 162. While the above control system 180 envisions the use of one or more bladders 164, it should be understood that such a control system 180 could be employed with other actuators 176 as described elsewhere in this disclosure, either alone or in combination with one or more bladders 164.

Figure 14:
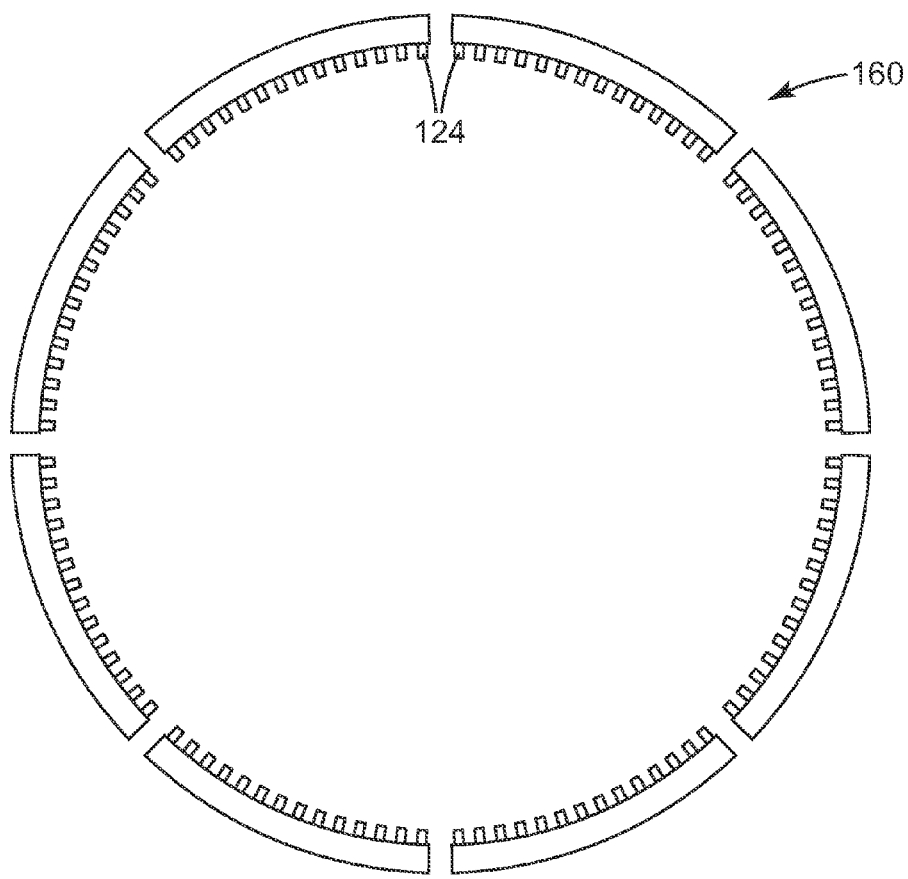
FIG. 14 is a schematic cross-section view taken, for example, at 10-10 of FIG. 2 depicting an exemplary variable aperture portion according to the present disclosure.

Turning now to FIG. 14, the variable aperture portion 160 may comprise a plurality of forming protrusions 124 extending inwardly from an inner surface of the variable aperture portion 160—typically from the aperture 162 itself—to form corresponding depressions in an outer surface of the still pliable coherent mass 60 as it advances through the die 120. In one such embodiment, such forming protrusions 124 are disposed on an inner surface of the forming tube 172, although forming protrusions 124 may also be disposed directly on a bladder surface or other surface that bears directly upon the coherent mass 60. These depressions remain after the coherent mass 60 is cooled and hardened and can increase the surface area of the outer surface of the coherent mass 60, thereby improving, for example, the sediment life of the resulting filter element 80.

Figure 1:
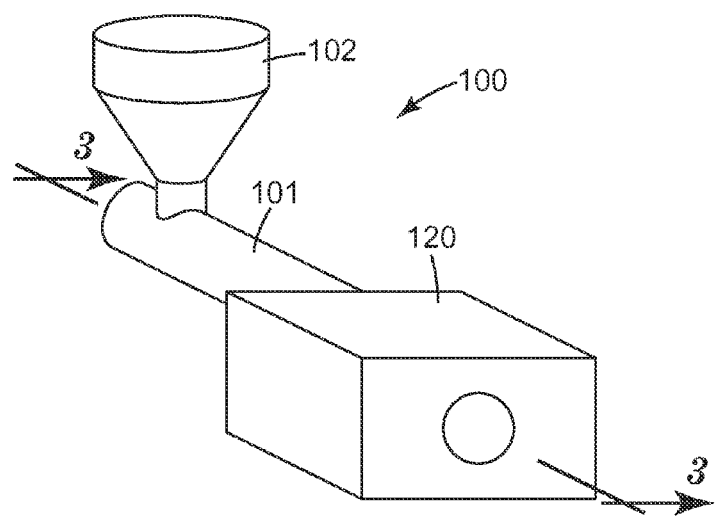
FIG. 1 is a perspective view of an exemplary apparatus for forming filter elements according to the present disclosure.
Figure 2:
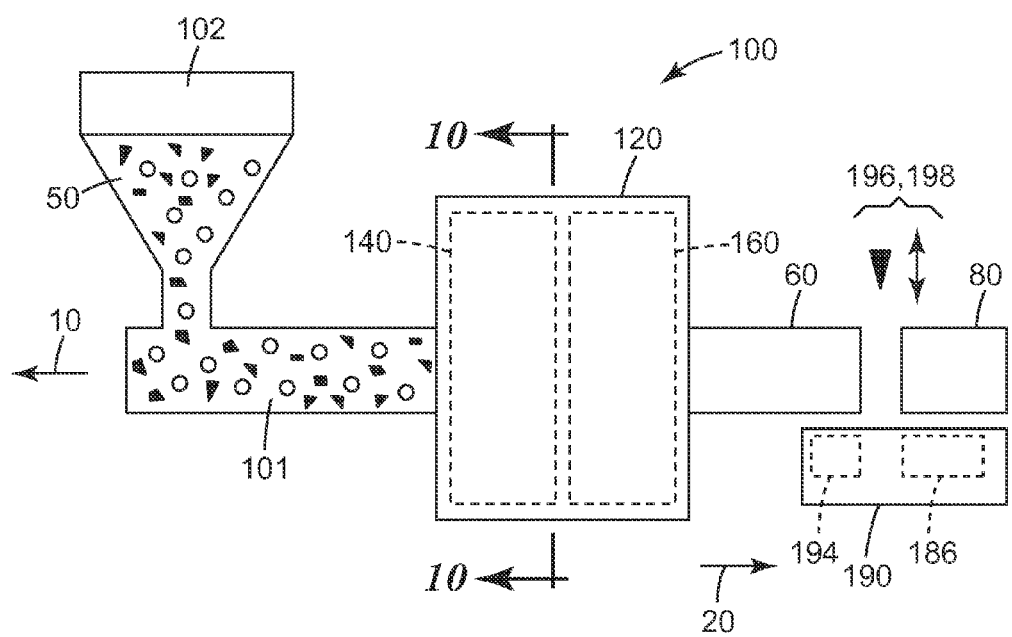
FIG. 2 is a schematic view of an exemplary apparatus for forming filter elements according to the present disclosure.

In some embodiments, such as the one shown in FIG. 2, an outfeed system 190 is provided with the apparatus 100 to receive the coherent mass 60 from the die 120. The outfeed system 190 may include, for example, a ball transfer table 192 to provide low-friction support to the coherent mass 60 as it leaves 168 the die 120. In some embodiments, the outfeed system 190 comprises a cooling apparatus 194 to cool the coherent mass 60. In some embodiments, the outfeed system 190 comprises a cutter 196 to cut the coherent mass 60 into lengths to form filter elements 80. Where cooling is employed, the coherent mass 60 may be cut before or after cooling. A typical cutter 196 may comprise, for example, a guillotine blade or rotating saw blade to chop the coherent mass 60 to length. The outfeed system 190 may further comprise a measurement system 198 to measure the length of each filter element 80, or to measure the length of the coherent mass 60 leaving the die 120 in order to determine the proper location to make a cut. In some embodiments, the outfeed system 190 comprises a scale 186, to weigh the coherent mass 60, a filter element 80, or both. As described above, and where applicable, such a scale 186 or measurement system 198 may be used in a control system 180 to regulate the variable aperture portion 160.

Various modifications and alterations of the invention will be apparent to those skilled in the art without departing from the spirit and scope of the invention. It should be understood that the invention is not limited to illustrative embodiments set forth herein.

What is claimed is:

1. A method of forming a filter element comprising:
   introducing a mixture into a feeder, the mixture comprising a plurality of activated carbon susceptor particles and a plurality of polymeric binder particles;
   advancing the mixture through the feeder and into a die, the die comprising an excitation portion;
   while advancing the mixture through the excitation portion, inducing eddy currents in the activated carbon susceptor particles by subjecting the mixture to a high-frequency electromagnetic field, the eddy currents being sufficient to elevate the temperature of the activated carbon susceptor particles to cause adjacent polymeric binder particles to be heated to at least a softening point;
   binding the activated carbon susceptor particles with the heated polymeric binder particles in the die to form a coherent mass;
   advancing the coherent mass out of the die; and
   cooling the coherent mass to form the filter element.

2. The method of claim 1 wherein the die further comprises a variable aperture portion following the excitation portion, the method further comprising:
   advancing the mixture through the variable aperture portion.

3. The method of claim 2 comprising setting an aperture of the variable aperture portion to regulate an extrusion profile of the coherent mass.

4. The method of claim 1 wherein the excitation portion of the die comprises a heating tube through which the mixture advances while being subjected to the high-frequency electromagnetic field, the heating tube comprising an electrically insulating material.

5. The method of claim 1 wherein the feeder does not cause compression of the mixture.

6. The method of claim 1 wherein the feeder comprises a feeder shaft, the feeder shaft comprising an auger portion and a core pin portion extending beyond the auger portion into the die; the method comprising
   rotating the auger portion to advance the mixture through the feeder; and
   the core pin forming an internal profile of the coherent mass such that the coherent mass is tubular.

7. The method of claim 6 further comprising not rotating the core pin portion.

8. The method of claim 6 wherein the core pin portion comprises an electrically insulating material.

9. The method of claim 1 wherein the feeder comprises a feeder exit positioned adjacent the die, the method comprising disrupting the mixture by radial expansion near the feeder exit to reduce any flow patterns established while advancing the mixture through the feeder.

10. The method of claim 9 wherein disrupting the mixture comprises allowing the mixture to expand radially outwardly upon leaving the feeder exit.

11. The method of claim 9 wherein disrupting the mixture comprises allowing the mixture to expand radially inwardly upon leaving the feeder exit.

12. The method of claim 10 wherein the feeder exit comprises a feeder exit diameter and the die comprises a die entrance portion;
wherein the die entrance portion tapers outwardly from the feeder exit diameter.

13. The method of claim 11 wherein the feeder comprises a feeder shaft, the feeder shaft comprising an auger portion terminating near the feeder exit and a core pin portion extending beyond the auger portion into the die, the auger portion comprising an auger minor diameter;
wherein the core pin portion tapers inwardly from the auger minor diameter.

14. The method of claim 3 wherein setting the aperture comprises inflating or deflating one or more bladders surrounding the heated mixture.

15. The method of claim 3 wherein setting the aperture comprises positioning a forming tube surrounding the heated mixture.

16. The method of claim 15 wherein the forming tube comprises a plurality of leaves surrounding the heated mixture, wherein setting the aperture comprises positioning the plurality of leaves surrounding the heated mixture.

17. The method of claim 15 wherein positioning the forming tube comprises actuating one or more actuators connected to the forming tube.

18. The method of claim 17 wherein one or more actuators comprises an inflatable bladder.

19. The method of claim 1 wherein the high-frequency electromagnetic field oscillates in a range from about 500 kHz to about 30 MHz.

20. The method of claim 1 wherein no heat is provided to the mixture while in the feeder.

21. The method of claim 1 wherein no cooling is provided to the mixture while in the feeder.

22. The method of claim 1 wherein the polymeric binder particles comprise ultra high molecular weight polyethylene.

23. The method of claim 1 wherein binding the activated carbon susceptor particles with the heated polymeric binder particles comprises sintering the mixture such that a coherent mass is formed but polymeric binder does not coat the susceptor particles.

24. The method of claim 3 further comprising forming a plurality of depressions in the extrusion profile as the coherent mass advances through the variable aperture portion.

25. The method of claim 6 wherein an induction heater is positioned circumferentially surrounding the core pin.

26. The method of claim 9 wherein disrupting the mixture comprises allowing the mixture to expand radially outwardly upon leaving the feeder exit and allowing the mixture to expand radially inwardly upon leaving the feeder exit.

27. The method of claim 15 wherein the forming tube surrounds the heated mixture and the forming tube surrounds a core pin.

* * * * *